United States Patent [19]

Fukuzawa et al.

[11] Patent Number: 6,037,425
[45] Date of Patent: *Mar. 14, 2000

[54] EPOXY RESIN COMPOSITION

[75] Inventors: Takao Fukuzawa; Tetsuro Imura; Masayuki Ohta, all of Yokkaichi, Japan

[73] Assignee: Shell Oil Company, Houston, Tex.

[*] Notice: This patent issued on a continued prosecution application filed under 37 CFR 1.53(d), and is subject to the twenty year patent term provisions of 35 U.S.C. 154(a)(2).

[21] Appl. No.: 08/755,769

[22] Filed: Nov. 21, 1996

[51] Int. Cl.$^7$ ................................................ C08G 59/18
[52] U.S. Cl. .................. 525/481; 525/506; 525/523; 525/533; 528/95; 528/96; 528/104; 528/112
[58] Field of Search .............. 528/95, 96, 104, 528/112; 525/481, 506, 523, 533

[56] References Cited

U.S. PATENT DOCUMENTS

| | | | |
|---|---|---|---|
| 3,676,397 | 7/1972 | Clarke | 528/93 |
| 4,159,285 | 6/1979 | Passalenti et al. | 525/502 |
| 4,320,222 | 3/1982 | Lopez | 528/89 |
| 4,684,700 | 8/1987 | Wang et al. | 525/507 |
| 4,783,509 | 11/1988 | Cavitt et al. | 525/523 |
| 5,025,067 | 6/1991 | Yamamoto et al. | 525/109 |
| 5,198,146 | 3/1993 | Shomer | 528/93 |
| 5,623,031 | 4/1997 | Imura et al. | 525/489 |

FOREIGN PATENT DOCUMENTS

| | | |
|---|---|---|
| WO 9521879 | 8/1995 | European Pat. Off. . |
| 3-014817 | 9/1993 | Japan . |
| 63-227624 | 9/1993 | Japan . |

OTHER PUBLICATIONS

Lee et al, "Handbook of Epoxy Resins", pp. 4–2,4–14,6–17 and 6–18, McGraw Hill, 1967.

*Primary Examiner*—Robert Dawson
*Assistant Examiner*—D. Aylward
*Attorney, Agent, or Firm*—Y. Grace Tsang

[57] ABSTRACT

The present invention provides an epoxy resin composition useful for casting applications, comprising a reaction product obtained by reacting (A) a bisphenol epoxy resin, and (B) bisphenol compounds, and if necessary, (C) monofunctional phenols or carboxylic acid compounds, in the presence of sodium compounds, wherein the epoxy resin composition has (a) an epoxy equivalent: 250 to 500 g/equivalent,
(b) a sodium content: 20 to 200 ppm, and
(c) a haze of its 40 wt % methyl ethyl ketone solution measured according to ASTM D 1003: 15% or less.

11 Claims, No Drawings

EPOXY RESIN COMPOSITION

FIELD OF THE INVENTION

The present invention relates to an epoxy resin composition. More particularly, the invention relates to an epoxy resin useful for casting applications.

BACKGROUND OF THE INVENTION

Epoxy resins are excellent in electrical insulating property, heat resistance, chemical resistance, and workability, and therefore are used as, for example, semiconductor encapsulating materials, laminates for printed circuit boards, insulating varnishes, and the like particularly in electric and electronic fields. Solventless type varnishes containing epoxy resins and acid anhydride hardeners are generally used as insulation casting resins for electric and electronic instruments. In particular, epoxy resins are used for casting for large-sized electric parts for heavy electric instruments and large-sized structures, which are required to have mechanical strength and toughness. Bisphenol A diglycidyl ether type epoxy resins having an epoxy equivalent of 250 to 500 g/equivalent are used in combination with acid anhydride hardeners.

In the case of large-sized cast products, it is necessary to conduct curing reaction slowly over a long period of time and to make exotherm due to curing reaction gentle in order to decrease stress due to curing shrinkage and residual heat stress after curing. For this reason, accelerators are not added to the formulation of epoxy resins and acid anhydride hardeners, or if added, accelerators are added to the formulation in very slight amount. As the size of cast products increases, curing reaction is conducted mildly, and control of curing process such as temperature and time in the course of curing is conducted very strictly.

However, conventional casting epoxy resins have problems that, in particular, in the formulation of the resins and acid anhydride hardeners, where accelerators are not added to the formulation, even if control of temperature and time in the course of curing is strictly conducted, the properties of obtained cast products such as heat resistance or crack resistance vary widely. Therefore, for the epoxy resins used in casting, curing reactivity of the resins and properties of cured products are previously confirmed prior to use thereof, and only specific production lot is selected and used. Further, depending on the results by such a confirmation, formulation and curing conditions may be adjusted. However, this leads to complicated process control.

Therefore, it is desirable to obtain an epoxy resin composition useful in casting applications, in which the cured cast products finally obtained are excellent in heat resistance and crack resistance, and have stable qualities.

SUMMARY OF THE INVENTION

Accordingly, the present invention provides an epoxy resin composition useful for casting applications, comprising a reaction product obtained by reacting (A) a bisphenol epoxy resin, and (B) at least one bisphenol compound, and (C) optionally, monofunctional phenols or carboxylic acid compounds, in the presence of sodium compounds, wherein said epoxy resin composition has an epoxy equivalent within the range of 250 to 500 g/equivalent, a sodium content within the range of 20 to 200 ppm, and a haze of its 40 wt % methyl ethyl ketone solution measured according to ASTM D 1003 of 15% or less.

DETAILED DESCRIPTION OF THE INVENTION

The epoxy resin composition of the invention can be obtained by reacting a bisphenol type epoxy resin, and bisphenol compounds, and if necessary, monofunctional phenols, using specific catalysts. The epoxy resin composition according to the invention yields a cured product having good heat resistance and crack resistance, and is useful as a casting epoxy resin.

1. Epoxy Resin

The epoxy resin composition of the present invention is obtained by reacting (A) a bisphenol epoxy resin, and (B) bisphenol compounds, and if necessary, (C) monofunctional phenols or carboxylic acid compounds, in the presence of sodium compounds which is used as a catalyst.

(A) Bisphenol Type Epoxy Resin

Examples of the bisphenol epoxy resin that can be used in the present invention include epoxy resins having bisphenol A, bisphenol F or tetrabromobisphenol A, as a base. Of those, preferred one is bisphenol A-based epoxy resin, and examples thereof include EPON® Resin 828 (available from Shell Chemical Co.), EPON® Resin 826 (available from Shell Chemical Co.) and EPON® Resin 834 (available from Shell Chemical Co.), each having an epoxy equivalent of 175 to 280 g/equivalent.

(B) Bisphenol Compounds

Examples of the bisphenol compounds that can be used in the present invention include bisphenol A, bisphenol F and tetrabrompobisphenol A. Of those, preferred one is bisphenol A.

(C) Monofunctional Phenols or Carboxylic Acid Compounds

Examples of the monofunctional phenols that can optionally be used in the present invention include phenol, cresols, xylenols, ethyl phenol, propyl phenol, isopropyl phenol, n-butyl phenol, sec-butyl phenol, t-butyl phenol, amyl phenol, octyl phenol, cumyl phenol, nonyl phenol, vinyl phenol, and allyl phenol. Of those, preferred one is alkyl substituted phenols.

Examples of the carboxylic acid compounds that can be optionally be used in the present invention include formic acid, acetic acid, propionic acid, butyric acid, isobutyric acid, valeric acid, isovaleric acid, pivalic acid, lauric acid, myristic acid, palmitic acid, stearic acid, capric acid, acrylic acid, methacrylic acid, crotonic acid, isocrotonic acid, oleic acid, propionic acid, benzoic acid, toluic acid, naphthoic acid, cinnamic acid, nicotinic acid, isonicotinic acid, furancarboxylic acid, and thiophene carboxylic acid.

The sodium compounds used as a catalyst in the present invention are represented by the following formula $$NaX \quad (I)$$

where, X represents a hydroxyl group, a halogen atom, a hydrogen atom, an alkoxide group, a phenoxide group, or a carboxylate group. Examples of the sodium compounds include sodium hydroxide, sodium chloride, sodium fluoride, sodium bromide, sodium iodide, sodium hydride, sodium alkoxides such as sodium methoxide or sodium ethoxide, sodium phenoxide, sodium salts of alkyl phenols, sodium salts of bisphenols, sodium acetate, sodium stearate, and sodium salts of organic acids, such as sodium salts of dibasic acids such as disodium phthalate or sodium hydrogen phthalate. Further, those sodium compounds can be used in conjunction with tertiary amines, imidazoles, cyclic amines, quaternary ammonium salts, phosphines, phosphonium salts, inorganic and organic metal salts other than sodium salt, and the like.

An epoxy resin composition can be produced by using only a compound other than the above-mentioned sodium compounds as a catalyst, but such an epoxy resin has problems that a cured product of the casting epoxy resin composition has low glass transition temperature, low mechanical strength or poor crack resistance, as compared with the epoxy resin produced using the sodium compounds represented by the formula (I) as a catalyst.

It is necessary for the sodium compounds represented by the formula (I) to be added in an amount such that the sodium content in the epoxy resin composition finally obtained within the range of 20 to 200 ppm, and preferably 40 to 120 ppm.

The sodium content in the epoxy resin composition can be determined with an atomic absorption method by subjecting the epoxy resin to dry incineration treatment, and then dissolving the same in hydrochloric acid aqueous solution.

In some cases, the bisphenol epoxy resin used as a raw material for the epoxy resin composition of the present invention may contain sodium compounds such as sodium chloride as a by-product in its synthesis. In such cases, since those sodium compounds also have the same function as in the sodium compounds represented by the formula (I), it is necessary that the sodium content originated from all those sodium compounds within the range of 20 to 200 ppm.

Where the sodium compounds represented by the formula (1) are added in such an amount that the sodium content in the epoxy resin is larger than 200 ppm, curing reaction of the casting resin composition having formulated therein acid anhydride hardeners proceeds too fast, curing exotherm rapidly generates, and as a result, it is difficult to control curing reaction, which are undesirable. On the other hand, where the sodium content in the epoxy resin is less than 20 ppm, curing rate of the casting resin composition proceeds very slow, which is not practical.

Reaction is conducted by adding sodium compounds represented by the above formula (I) to a mixture of a bisphenol epoxy resin, bisphenol compounds, and if necessary, monofunctional phenols or carboxylic acid compounds, and then conducting the reaction at 100 to 200° C. for 30 minutes to 20 hours. This reaction can be conducted in a solvent such as aliphatic and aromatic hydrocarbons, ketones, aldehydes, alcohols, ethers, halogen-containing solvents such as chloroform, aproticpolar solvents such as dimethylformamide or dimethylsulfoxide, water, or mixed solvents of them, but it is necessary to finally remove the solvent used from the resin.

It is necessary for the epoxy resin composition of the present invention to have an epoxy equivalent of 250 to 500 g/equivalent, and preferably 300 to 450 g/equivalent. If the epoxy equivalent is larger than 500 g/equivalent, viscosity of the composition having formulated herein acid anhydride hardeners before curing increases, whereby workability of the composition at casting becomes very poor or heat resistance of the cured product deteriorates, which are undesirable. On the other hand, if the epoxy equivalent is less than 250 g/equivalent, crack resistance of the cured product deteriorates or when fillers are formulated in the composition, such problem arises that viscosity of the composition is too low, so that precipitation of fillers is liable to occur, which are also undesirable.

Haze of a 40 wt % methyl ethyl ketone solution of the epoxy resin of the present invention is measured by the following method. Epoxy resin and methyl ethyl ketone are placed in a glass-made flask with a plug, and a 40 wt % methyl ethyl ketone solution of the epoxy resin is prepared at room temperature using a shaking apparatus. The resulting solution is placed in a glass cell having an optical path length of 10 mm. Total luminous transmittance and diff-use luminous transmittance of the sample solution are measured using an integrating sphere type light transmissometer (Voick integrating sphere type light transmissometer SEP-HS-DS type, produced by Nippon Seimitsu Kogaku Co., Ltd.) at 23° C. according to ASTM D 1003, and the haze can be calculated by the following equation. The haze is 15% or less, and preferably 12% or less.

$$\text{Haze (\%)} = \frac{\text{Diffuse luminous transmittance}}{\text{Total luminous transmittance}} \times 100$$

If the haze is larger than 15%, problems arise that glass transition temperature of the cured product of the casting epoxy resin composition lowers, mechanical strength of the cure product deteriorates, mechanical strength of every test piece varies widely, and crack resistance of the cured product deteriorates.

2. Curable Epoxy Resin Composition

The epoxy resin composition of the present invention is used as a casting epoxy resin composition by generally combining with acid anhydrides, and if necessary, formulating fillers, additives, and the like.

The epoxy resin composition of the present invention can be used in combination with a small amount of bifunctional epoxy resins such as bisphenol epoxy resins other than the above-described epoxy resins, biphenyl type epoxy resins, hydroquinone type epoxy resins, resorcin type epoxy resins, or naphthalene type epoxy resins; multifunctional epoxy resins such as phenol novolak type epoxy resins, or cresol novolak type epoxy resins; brominated epoxy resins; glycidyl ester type epoxy resins; glycidyl amine type epoxy resins; cycloaliphatic epoxides; and the like.

(D) Acid Anhydride Hardeners

Examples of the acid anhydride hardeners formulated in the casting epoxy resin composition (curable epoxy resin composition) of the present invention include phthalic anhydride, trimellitic anhydride, pyromelltic anhydride, benzophenonetetracarboxylic dianhydride, ethylene glycol bis-anhydrotrimellitate, glycerol tris-anhydrotrimellitate, methyltetrahydrophthalic anhydride, tetrahydrophthalic anhydride, nadic anhydride, methylnadic anhydride, hexahydrophthalic anhydride, methylhexahydrophthalic anhydride, 5-(2,5-dioxotetrahydrofuryl)-3-methyl-3-cyclohexane-1,2-dicarboxylic anhydride, dodecenyl succinic anhydride, polyazelaic anhydride, polydodecanic anhydride, and chlorendic anhydride. Those acid anhydride epoxy resin hardeners can be used as mixtures of two or more thereof. Those acid anhydride hardeners which are previously modified with alcohol compounds can also be used. The amount of the acid anhydride hardeners used is generally within the range of 0.7 to 1.2 equivalents, and preferably 0.8 to 1.0 equivalent, to epoxy groups in the epoxy resin.

(E) Fillers

Various fillers can be formulated in the casting epoxy resin composition of the present invention. Examples of the fillers include inorganic fillers such as silica, alumina, mica powder, calcium carbonate, aluminum hydroxide, magnesium carbonate, talc, clay, kaolin, dolomite, silicon carbide, glass powder, titanium dioxide, boron nitride, or silicon nitride, and sheet and tape materials such as mica, glass, polyester, aramide, or polyimide. Those fillers can be used as mixtures of two or more thereof. Further, if necessary, those fillers may be surface treated with silane or titanate coupling agents.

(F) Additives

If required, various additives other than the above fillers can be formulated in the casting epoxy resin composition of the present invention. Examples of the additives which can formulated in the casting epoxy resin composition include various pigments, coloring agents, flame retardants, diluents, coupling agents, flexibilizers, trace amount of cure accelerators, dispersants, wetting agents, defoaming agents, antioxidants, ultraviolet absorbers, photostabilizers such as HALS, and reinforcing agents such as rubber particles.

Various methods can be employed in the preparation of the casting epoxy resin composition of the present invention. After all the components are mixed, the resulting mixture is poured into a mold, and cured at a temperature sufficient to cure the composition, for example, at a temperature within the range of 100 to 200° C. If necessary, after releasing the cured product from the mold, the cured product may be post-cured. Thus, a cured product excellent in heat resistance and crack resistance can be formed.

EXAMPLE

The present invention is described specifically with reference to the examples, but the present invention is not limited to those examples.

Resin Production Example 1

1000 g of liquid bisphenol A type epoxy resin (trade name: Epikote 828, produced by Yuka Shell Epoxy K.K.; epoxy equivalent: 189 g/equivalent), 200 g of bisphenol A, and 50 g of p-t-butylphenol were heated to 130° C., and 0.6 g of 28 wt % sodium methoxidemethanol solution was added thereto. The resulting mixture was heated to 150° C. and maintained at the same temperature for 3 hours to conduct reaction, thereby obtaining Epoxy Resin A. Epoxy Resin A had an epoxy equivalent of 395 g/equivalent and a sodium content of 57 wt-ppm. Further, the haze of a 40 wt % methyl ethyl ketone solution of the resin was 19%.

Resin Production Example 2

Epoxy Resin B was obtained by conducting reaction in the same manners as in Resin Production Example 1 above except that 0.5 g of 2-ethyl-4-methylimidazole was used in place of 0.6 g of 28 wt % sodium methoxide-methanol solution. Epoxy Resin B had an epoxy equivalent of 396 g/equivalent, and a sodium content of less than 1 wt-ppm. Further, the haze of a 40 wt % methyl ethyl ketone solution of the resin was less than 0.1%.

Resin Production Example 3

Epoxy Resin C was obtained by conducting reaction in the same manners as in Resin Production Example 1 above except that the catalyst addition temperature was changed from 130° C. to 50° C. Epoxy Resin C had an epoxy equivalent of 394 g/equivalent, and a sodium content of 57 wt-ppm. Further, the haze of a 40 wt % methyl ethyl ketone solution of the resin was 7%.

Resin Production Example 4

Epoxy Resin D was obtained by conducting reaction in the same manners as in Resin Production Example 1 above except that 0.54 g of sodium p-t-butylphenoxide was used in place of 0.6 g of 28 wt % sodium methoxide-methanol solution and the catalyst addition temperature was changed from 130° C. to 50° C. Epoxy Resin D had an epoxy equivalent of 393 g/equivalent, and a sodium content of 57 wt-ppm. Further, the haze of a 40 wt % methyl ethyl ketone solution of the resin was 8%.

Examples 1 to 3, and Comparative Examples 1 to 2

Using each epoxy resin obtained in Resin Production Examples 1 to 4 above, a liquid acid anhydride hardener (trade name: Epicure DX 126, methyltetrahydrophthalic anhydride, produced by Yuka Shell Epoxy K.K.) and alumina filler (produced by Showa Denko K.K., average particle diameter: 10 μm), those materials were formulated according to the formulation as shown in Table 1, and mixed at 125° C. with a universal mixer. After defoaming, the resulting mixture was poured into a metal mold, and cured at 150° C. for 24 hours to obtain a test piece. The following tests (a) to (d) were conducted on each test piece. The results obtained are shown in Table 1.

(a) Gelation Time

Measurement was conducted on an uncured composition at 125° C. by a test tube method prescribed in JIS C-2105.

(b) Glass Transition Temperature

Glass transition temperature of a test piece was measured by using a differential scanning calorimeter (DSC).

(c) Flexural Modulus of Elasticity, Flexural Strength

Flexural modulus of elasticity and flexural strength of a test piece were measured according to JIS K-6911.

(d) Crack Resistance Test

According to JIS C-2105, cast-molded test pieces inserting a washer were subjected to thermal cycles, and occurrence of cracks was examined. The total cycle number at the point of occurrence of cracks was counted.

As can be seen from Table 1, the cured products of Examples 1 to 3 have high glass transition temperature, high flexural strength, and considerably improved crack resistance as compared with the cured products of Comparative Examples 1 to 2.

The epoxy resin composition of the present invention and curable epoxy resin composition provide cured products excellent in heat resistance, mechanical strength, and crack resistance as compared with conventional resins.

TABLE 1

|  |  | Example 1 | Example 2 | Example 3 | Comparative Example 1 | Comparative Example 2 |
|---|---|---|---|---|---|---|
| Composition (parts by weight) | Epoxy Resin A | — | — | — | 100 | — |
|  | Epoxy Resin B | — | — | — | — | 100 |
|  | Epoxy Resin C | 100 | — | — | — | — |
|  | Epoxy Resin D | — | 100 | — | — | — |
|  | Epoxy Resin E | — | — | 100 | — | — |
|  | Epikure DX 126 | 38 | 38 | 38 | 38 | 38 |
|  | Alumina filler | 250 | 250 | 250 | 250 | 250 |
|  | Gelation time (min) | 180 | 185 | 185 | 185 | 190 |
| Properties of cured product | Glass transition temperature (° C.) | 121 | 120 | 120 | 113 | 111 |
|  | Flexural modulus of elasticity (kg/mm$^2$) | 940 14.0 | 950 | 940 | 930 | 930 |
|  | Flexural strength (kg/mm$^2$) | 12 | 13.8 | 14.1 | 12.2 | 12.0 |
|  | Crack resistance (total cycle number) |  | 11 | 14 | 5 | 6 |
|  | Haze of epoxy resin (%) (40%-MEK solution) | 7 | 8 | 5 | 19 | 0.1 or less |
|  | Sodium content in epoxy resin (ppm) | 57 | 57 | 57 | 57 | 1 or less |

We claim:

1. An epoxy resin composition comprising a reaction product obtained by reacting (A) a bisphenol epoxy resin selected from the group consisting of bisphenol A epoxy resin, bisphenol F epoxy resin and tetrobromobisphenol A epoxy resin, and (B) at least one bisphenol compound selected from the group consisting of bisphenol A, bisphenol F and tetrobromobisphenol A, and (C) optionally, a monofunctional phenol or a monofunctional carboxylic acid compound, in the presence of (D) at least one sodium compound represented by the formula:

NaX wherein X is a hydroxyl group, a halogen atom, a hydrogen atom, an alkoxide group, a phenoxide group or a carboxylate group, wherein said epoxy resin composition has an epoxy equivalent within the range of 300 to 450 g/equivalent, a sodium content within the range of 20 to 200 ppm, and a haze of its 40 wt % methyl ethyl ketone solution measured according to ASTM D 1003 of 15% or less.

2. The epoxy resin composition of claim 1 wherein the sodium content in is within the range of 40 to 120 ppm based on the total weight of the component (A), component (B) and component (C).

3. The epoxy resin composition of claim 2 wherein the epoxy equivalent of the reaction product is within the range of 300 to 450 g/equivalent.

4. The epoxy resin composition of claim 3 wherein the haze of the 40 wt % methyl ethyl ketone solution of the reaction product measured according to ASTM D 1003 is 12% or less.

5. The epoxy resin composition of claim 1 wherein the component (A) is a bisphenol A epoxy resin.

6. The epoxy resin composition of claim 1 wherein the component (C) is an alkyl substituted phenol.

7. The epoxy resin composition of claim 1 wherein the sodium compound is selected from the group consisting of sodium hydroxide, sodium chloride, sodium fluoride, sodium bromide, sodium iodide, sodium hydride, sodium alkoxides, sodium phenoxide, sodium salts of alkyl phenols, sodium salts of bisphenols, sodium acetate, sodium stearate, and sodium salts of organic acids.

8. A curable epoxy resin composition comprising the epoxy resin composition of claim 1 and acid anhydride hardeners.

9. A cured product of claim 8.

10. A curable epoxy resin composition comprising the epoxy resin composition of claim 9 and acid anhydride hardeners.

11. A cured product of claim 10.

* * * * *